(12) United States Patent
Kokkevis et al.

(10) Patent No.: US 8,913,068 B1
(45) Date of Patent: Dec. 16, 2014

(54) DISPLAYING VIDEO ON A BROWSER

(75) Inventors: Evangelos Kokkevis, Mountain View, CA (US); Victoria Kirst, Seattle, WA (US)

(73) Assignee: Google Inc., Mountain View, CA (US)

( * ) Notice: Subject to any disclaimer, the term of this patent is extended or adjusted under 35 U.S.C. 154(b) by 438 days.

(21) Appl. No.: 13/367,119

(22) Filed: Feb. 6, 2012

Related U.S. Application Data

(60) Provisional application No. 61/506,920, filed on Jul. 12, 2011.

(51) Int. Cl.
*G06T 1/00* (2006.01)

(52) U.S. Cl.
USPC ........................................................ 345/522

(58) Field of Classification Search
CPC .......... G06F 17/30899; G06F 9/44526; G06F 21/606; G06F 2216/15; H04N 21/41407
USPC ........................................................ 345/522
See application file for complete search history.

(56) References Cited

U.S. PATENT DOCUMENTS

| | | | | |
|---|---|---|---|---|
| 8,074,248 | B2* | 12/2011 | Sigmon et al. | 725/110 |
| 2010/0077058 | A1* | 3/2010 | Messer | 709/219 |
| 2010/0118038 | A1* | 5/2010 | Labour et al. | 345/522 |
| 2010/0146523 | A1* | 6/2010 | Brigaut et al. | 719/330 |

* cited by examiner

*Primary Examiner* — Hau Nguyen
(74) *Attorney, Agent, or Firm* — Sterne, Kessler, Goldstein & Fox P.L.L.C.

(57) ABSTRACT

A system, method and computer-readable medium for a rendering a video on a browser. The system comprises a layout engine, a video decoder, a compositor, a GPU processing module, and a GPU. The layout engine identifies a video layer. The video decoder generates a plurality of bitmaps for updating a plurality of textures included in the layer. The compositor generates a set of rendering instructions for updating the plurality of textures that make up a quad. A shared memory stores plurality of bitmaps in the plurality of textures and the set of rendering instructions outside of the sandbox environment. The GPU processing module retrieves the plurality of textures and the rendering instructions and causes the GPU to render the video on a webpage using the rendering instructions and the plurality of the textures.

20 Claims, 6 Drawing Sheets

DISPLAYING VIDEO ON A BROWSER

This application claims the benefit of U.S. Provisional Application No. 61/506,920, filed on Jul. 12, 2011 and is incorporated by reference in its entirety.

BACKGROUND

A conventional web browser executing on a mobile computing device is unable to efficiently display video content. For example, because the conventional browser executes in a sandbox environment and does not have access to a graphics processing unit (GPU), the conventional browser relies on the central processing unit (CPU) to render video and graphics content of the webpage. However, processing video content on a CPU is expensive and inefficient. For example the CPU cannot efficiently perform mathematically complex color conversion and scaling calculations that are integral to displaying graphics and video content on a mobile device.

As mobile computing devices, such as smartphones, tablet computing devices, notebooks and laptops become commonplace, there is a need to provide and display video and graphics rich content on a browser of the mobile computing devices.

BRIEF SUMMARY

A system, method and computer-readable medium for a rendering a video on a browser. The system comprises a layout engine, a video decoder, a compositor, a GPU processing module, and a GPU. The layout engine identifies a video layer. The video decoder generates a plurality of bitmaps for updating a plurality of textures included in the layer. The compositor generates a set of rendering instructions for updating the plurality of textures that make up a quad. A shared memory stores plurality of bitmaps in the plurality of textures and the set of rendering instructions outside of the sandbox environment. The GPU processing module retrieves the plurality of textures and the rendering instructions and causes the GPU to render the video on a webpage using the rendering instructions and the plurality of the textures.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF EMBODIMENTS

While the present invention is described herein with references to illustrative embodiments for particular applications, it should be understood that the invention is not limited thereto. Those skilled in the art, with access to the teachings herein, will recognize additional modifications, applications, and embodiments within the scope thereof and additional fields in which the invention would be of significant utility.

Figure 1:
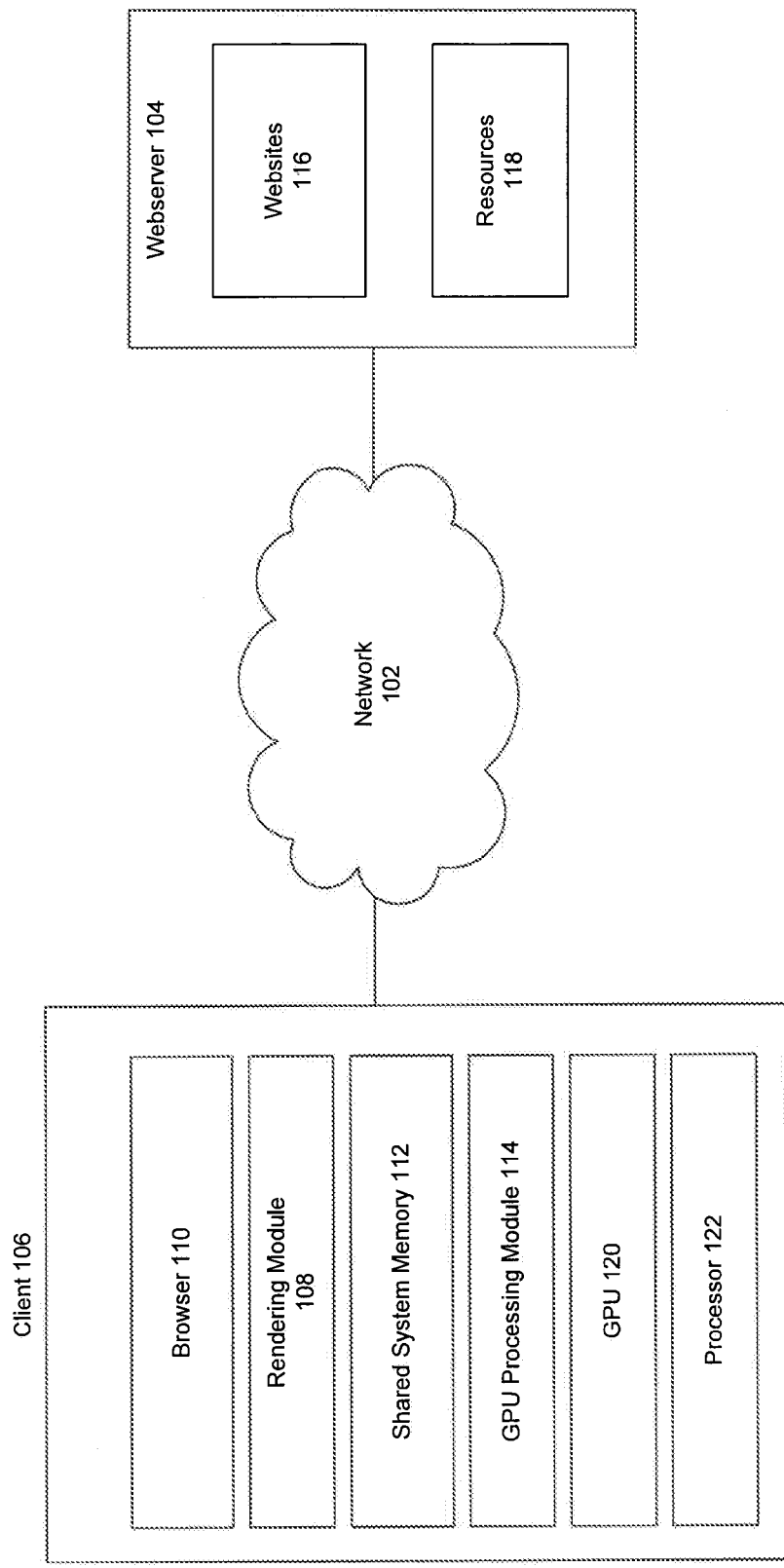
FIG. 1 is a block diagram of an exemplary embodiment of a client and server environment, according to an embodiment.

FIG. 1 is a block diagram of an exemplary system 100 of a client and server environment. The system 100 includes a network 102, a web server 104 and a client 106. Network 102 connects client 106 and web server 104. System 100 may include many thousands of web servers 104 and clients 106.

Network 102 may be any network, or combination of networks, that can carry data communication. Such a network 102 may include, but is not limited to, a local area network, medium area network, and/or wide area network, such as the Internet. Network 102 can support protocols and technologies including, but not limited to, World Wide Web protocols and/or services. Intermediate web servers, gateways, or other servers may be provided between components of the system shown in FIG. 1 depending upon a particular application or environment.

Web server 104 is an electronic device capable of sending, receiving, and storing resources 118. Resources 118 may be data that can be provided over network 102. Resources 118 include data inserted into hypertext markup language (HTML) pages, word processing documents, portable document format (PDF) documents, two and three-dimensional images, video content, graphics content, feed sources, and multimedia content, to name only a few. In an embodiment, web server 104 receives a request, such as an HTTP request from client 106, and, in response, sends resources 118 for display to client 106.

Web server 104 hosts multiple websites 116. Website 116 has one or more webpages associated with a domain name and is hosted by one or more web servers 104. An example website is a collection of webpages formatted in a HTML that can contain resources 118 described herein, as well as various programming elements, such as scripts.

Client 106 is an electronic computing device capable of requesting, receiving, and displaying resources 118 over network 102. Example clients 106 are personal computers, mobile communication devices, (e.g. smartphones, tablet computing devices, notebooks), set-top boxes, game-consoles, embedded systems, and other devices that can send and receive resources 118 over network 102. Client 106 includes a rendering module 108, a browser 110, a shared system memory 112, a GPU processing module 114, a GPU 120, and a processor 122.

GPU 120 is a specialized microprocessor that accelerates graphics and video rendering on client 106. GPU 120 is efficient at processing graphics and video content due to its highly parallel architecture that is adept at processing complex mathematical algorithms common in graphics, video, and scaling calculations. Client 106 may include multiple GPUs 120, to process, for example, graphics and video content.

Processor 122 is any conventional or special-purpose processor, including, but not limited to, digital signal processor (DSP), field programmable gate array (FPGA), and application specific integrated circuit (ASIC). Processor 122 executes applications such as browser 110 and rendering module 108. Client 106 may include multiple processors 122 for executing applications.

Browser 110 is an application that client 106 executes to display resources 118 to a user. In an embodiment, browser 110 can be a multi-threaded browser.

Figure 2:
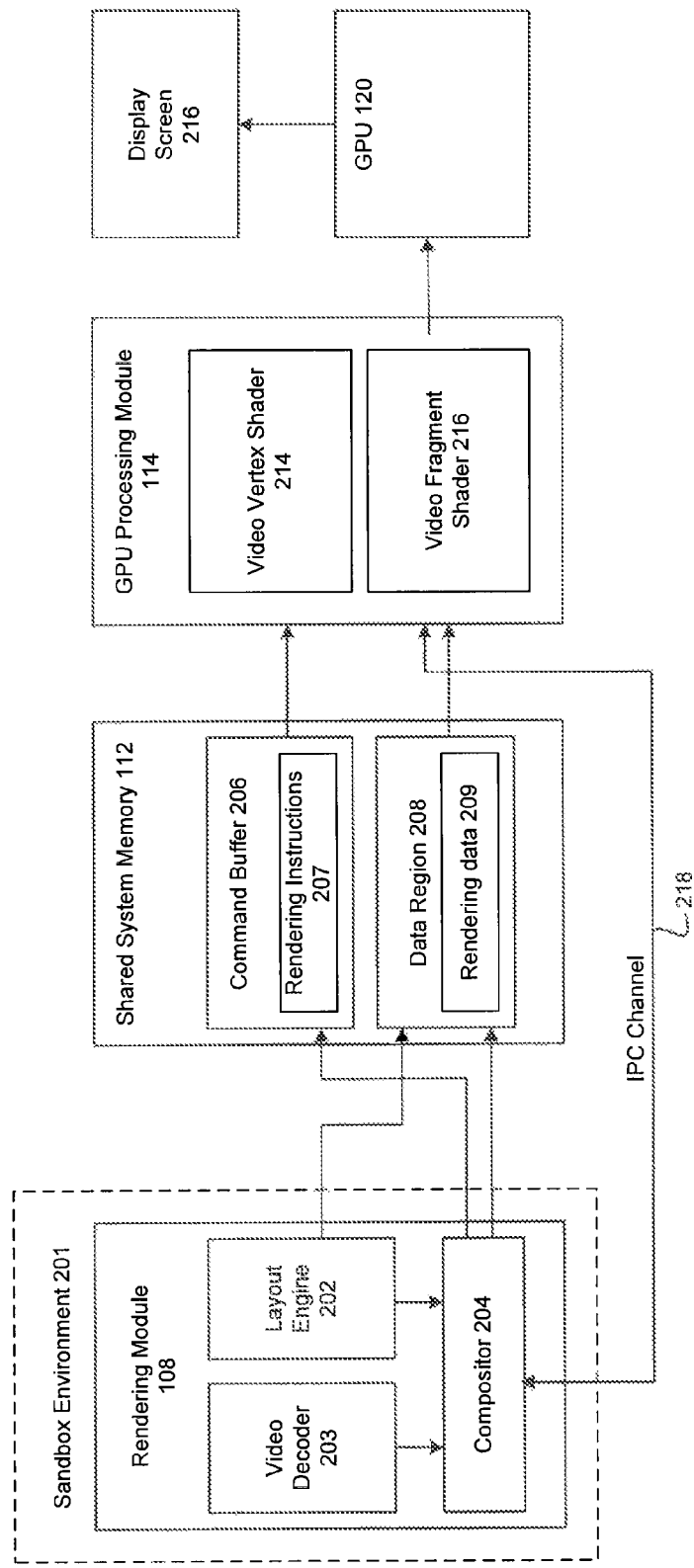
FIG. 2 is a block diagram of an exemplary embodiment for displaying a video on a browser, according to an embodiment.

Rendering module 108, shared system memory 112 and GPU processing module 114 facilitate a display of the video content on browser 110. FIG. 2 is an exemplary embodiment of an environment capable of displaying video on a browser.

Rendering module 108 in an application that execute in a sandbox environment 201. Applications executing in a sandbox environment 201 have limited access to system memory and other resources available to applications and processes that are executing outside of the sandbox environment. A person skilled in the art will appreciate that applications may execute in sandbox environment 201 to protect a computing device, such as client 106, from computer viruses and other malicious software.

In an embodiment, instructions and data may be passed between applications internal and external to sandbox environment 201. For example, rendering module 108 communicates with GPU processing module 114 by writing instructions and data into a specific memory location, such as shared system memory 112. Shared system memory 112 is external to sandbox environment 201. GPU processing module 114 is able to access shared system memory 112 and retrieve rendering data 209 and rendering instructions 207.

When client 106 receives messages that include video content, rendering module 108 initiates the rendering process. Rendering module 108 includes a layout engine 202, a video decoder 203 and a compositor 204. Layout engine 202 may be an open source engine, such as WebKit. Layout engine 202 receives video content in the HTML document and parses the HTML document into a document object model (DOM) tree. In an embodiment, the video content may include a scaling factor. The scaling factor determines the scaling of an image when it is displayed on a display screen. A person skilled in the art will appreciate that tree nodes in a DOM tree store HTML elements and associated text included in the HTML document.

Layout engine 202 generates a rendering object for each node in the DOM tree that produces visual content that is displayed on a display screen. Because each rendering object includes visual content, some rendering objects may include video content. A rendering object presents video content by, for example, storing draw( ) methods that act on the contents of a corresponding DOM tree node. Those draw( ) methods are interpreted by the GPU processing module 114 and are executed using a GPU 120. In an embodiment, the generated rendering objects are stored in a rendering object tree.

Layout engine 202 splits the visual content included in rendering objects into multiple layers. Layout engine 202 applies an algorithm to the rendering object tree that determines the rendering object(s) that may be included in each layer. Layout engine 202 may include rendering objects that display video content into a separate layer.

Video decoder 203 decodes a compressed video stream included in multiple channels. Each channel includes color frames for a color frame scheme. Each color frame represents colors in a texture. For the purposes of clarity, the examples herein are described in terms of the YUV color space processing scheme. However, a person skilled in the art will appreciate that the invention is not limited to this embodiment and that other color space processing schemes that include, but are not limited to an RGB color space, YIQ color space, YCbCr color space, YPbPr color space, etc., may be used.

In a YUV color scheme, each channel in video decoder 203 stores either a luminance or a chrominance component. The luminance component determines the brightness of the pixel and the chrominance component determines the color of the pixel in a video stream.

For example, in the YUV color scheme the video stream is included in three channels, where each channel includes a value for a Y component, a U component, or a V component. A person skilled in the art will appreciate that the Y component represents the luminance component and that the U and V components represent the two chrominance components.

For each video frame, video decoder 203 generates one or more bitmaps. In one embodiment, video decoder 203 generates a bitmap for each channel. For example, video decoder 203 generates a bitmap for each Y channel, U channel, and V channel. The bitmaps are stored in system memory 112 and are uploaded to GPU 120 as textures. In one embodiment, a texture is uploaded for each bitmap. In other embodiments, the bitmaps may be combined into one or more textures that are uploaded to GPU 120. A person skilled in the art will appreciate that the Y, U and V components from the textures may be combined to determine the RBG color for each pixel in a video stream.

Compositor 204 passes video content that includes instructions and data from layout engine 202 and video decoder 203 to GPU 120. Compositor 204 causes layout engine 202 to paint the contents of each layer into multiple bitmaps and store those bitmaps as rendering data 209 in shared system memory 112. After the bitmaps are stored in shared system memory 112, compositor 204 determines a layer that includes video content and issues rendering instructions 207 that initiate the rendering process of a video layer using GPU 120.

Shared system memory 112 is a memory region on client 106 that is accessible to applications executing inside sandbox environment 201 and to applications external to sandbox environment 201. Shared system memory 112 allows rendering module 108 to store rendering instructions 207 and rendering data 209 for rendering each layer. Shared system memory 112 also allows GPU processing module 114 to retrieve those instructions and data for rendering on GPU 120.

Shared system memory 112 includes a command buffer 206 and a data region 208. Data region 208 stores rendering data 209 that includes data, such a bitmaps, vertex arrays, etc. For example, when compositor 204 identifies a video layer that requires re-rendering in the layer tree, compositor 204 causes layer engine 202 to upload rendering data 209, such as the contents or a portion of a video layer that requires re-rendering, to a bitmap stored in data region 208.

Command buffer 206 is a storage area that stores rendering instructions 207. GPU 120 uses rendering instructions 207 to process rendering data 209. For example, GPU 120 uses rendering instructions 207 to re-render a video layer that requires re-rendering. In an embodiment, rendering instructions 207 are written in a platform-independent graphics language that compositor 204 and GPU processing module 114 understand. In an embodiment, the platform-independent graphics language is a serialized version of OpenGL for embedded systems (OpenGL ES), such as OpenGL ES 2.0 API. A person skilled in the art will appreciate that OpenGL ES API is a graphics language interface designed for embedded devices such as mobile phones and video-game consoles. In an embodiment where the rendering instructions 207 are in a language that GPU 120 cannot understand, GPU processing module 114 may include a translator (not shown) to translate rendering instructions 207 into a rendering language that GPU 120 can use.

When compositor 204 traverses a layer tree and identifies a video layer that requires re-rendering, compositor 204 generates rendering data 209 and rendering instructions 207. Rendering data 209 includes a set of four points. Each point in the set of points includes the three dimensional coordinates of a quad that is translated into one or more pixels on a display screen, as described below. Compositor 204 also retrieves the Y, U, and V frames from video decoder 203 that are associated with the layer that requires re-rendering. The textures included in Y, U, and V frames are also included as part of rendering data 209.

Compositor 204 also generates rendering instructions 207. Rendering instructions 207 may include a transformation matrix for transforming the quad into a correct position on the display screen. Also, rendering instructions 207 may include three sets of rendering instructions 207 for updating each texture in the YUV frame. In an embodiment, compositor 204 may store each set of rendering instructions 207 in command buffer 206 using an OpenGL command, such as glTexSubImage2D(textureID, pixelPtr, width, height), The textureID identifies the Y texture, the U texture or the V texture retrieved from video decoder 203. The pixelPtr is a data pointer that stores the memory address associated with the Y, U or V texture stored in rendering data 209. The width and height parameters determine the size of the decoded frame. Example instructions 207 may include:

glTexSubImage2D(YtextureID, YpixelPtr, Ywidth, Yheight);
glTexSubImage2D(UtextureID, UpixelPtr, Uwidth, Uheight);
glTexSubImage2D(VtextureID, VpixelPtr, Vwidth, Vheight);

In an embodiment, compositor 204 also includes a scaling factor retrieved from layout engine 202 in rendering instructions 207. The scaling factor determines the size of the video image on the display screen.

GPU processing module 114 passes rendering instructions 207 and rendering data 209 from shares system memory 112 to a vertex shader and a fragment shader. A vertex shader and a fragment shader are computer software programs that execute on GPU 120 and transform rendering instructions 207 and rendering data 209 into pixels on a display screen. A vertex shader that processes video data is a video vertex shader 214. A fragment shader that processes video data is a video fragment shader 216. In an embodiment, GPU processing module 114 uses, for example, an OpenGL command glDrawElements to pass rendering instructions 207 and rendering data 209 to video vertex shader 214 and video fragment shader 216.

Video vertex shader 214 receives rendering data 209 and rendering instructions 207 that include a transformation matrix for a video layer. In a non-limiting example, video vertex shader 214 uses the transformation matrix to calculate the position and orientation of the quad that contains a video displayed on the display screen. Video vertex shader 214 also uses a scaling factor to scale the size of each pixel displayed on a display screen.

Video fragment shader 216 determines a color of every pixel of a video layer that is displayed on a display screen. For example, video fragment shader 216 receives rendering data 209 that includes bitmaps that have been uploaded to a Y texture, a U texture, and a V texture and uses rendering instructions 207 to compute the red, green, blue (RGB) value of the Y, U and V textures.

GPU 120 renders contents of a webpage by rendering multiple layers that make up a webpage. Each layer in a webpage may be associated with a particular shader that is executed by GPU 120. When GPU 120 is ready to process a video layer, GPU processing module 114 uses an OpenGL command glBindProgram to indicate to GPU 120 to use video vertex shader 214 and video fragment shader 216 for processing the video layer that includes rendering instructions 207 and rendering data 209. As GPU 120 executes video vertex shader 214 and video fragment shader 216, GPU 120 applies rendering instructions 207 to rendering data 209 of a video layer and composites the resulting video on a webpage. In an embodiment, GPU 120 executes a glDraw( ) command to display the resulting video on browser 110.

System 200 also includes an inter-process communication channel (IPC channel) 218. IPC channel 218 enables GPU processing module 114 to communicate with compositor 204 executing inside sandbox environment 201, when compositor 204 issues rendering instructions 207 which return a result from GPU processing module 114 or from GPU 120. One example of such a rendering instruction 207 is an instruction that returns a value calculated by GPU 120 or a parameter that returns a state of GPU 120 back to compositor 204. Compositor 204 may use the returned result to, for example, issue additional rendering instructions 207 or traverse a layer tree.

Figure 3:
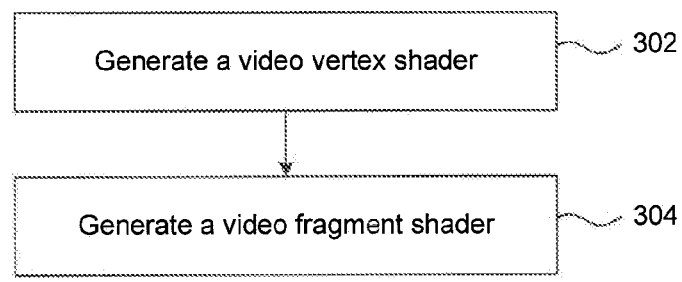
FIG. 3 is a flowchart of a method for generating a video vertex shader and a video fragment shader, according to an embodiment.

FIG. 3 is a flowchart of a method 300 of a developer generating a video vertex shader and a video fragment shader, according to an embodiment.

At stage 302, a video vertex shader is generated. For example, a developer writes and compiles video vertex shader 214 to process video layers. As described herein, video vertex shader 214 receives rendering data 209 that includes a set of coordinates that correspond to four points that make up a quad, and rendering instructions 207 that include a transformation matrix that determines where the quad is displayed on the display screen and the scaling factor for scaling the quad.

At stage 304, a video texture shader is generated. For example, a developer writes and compiles video fragment shader 216 to process video layers. As described herein, video fragment shader 216 receives rendering data 209 that includes a Y texture frame, a U texture frame and a V texture frame. Video fragment shader 216 includes instructions for transforming the values in the Y, U and V textures into an RGB color value for each pixel included in the quad. A person skilled in the art will appreciate that the RGB color value is the color of a pixel that is displayed on a display screen.

Figure 4:
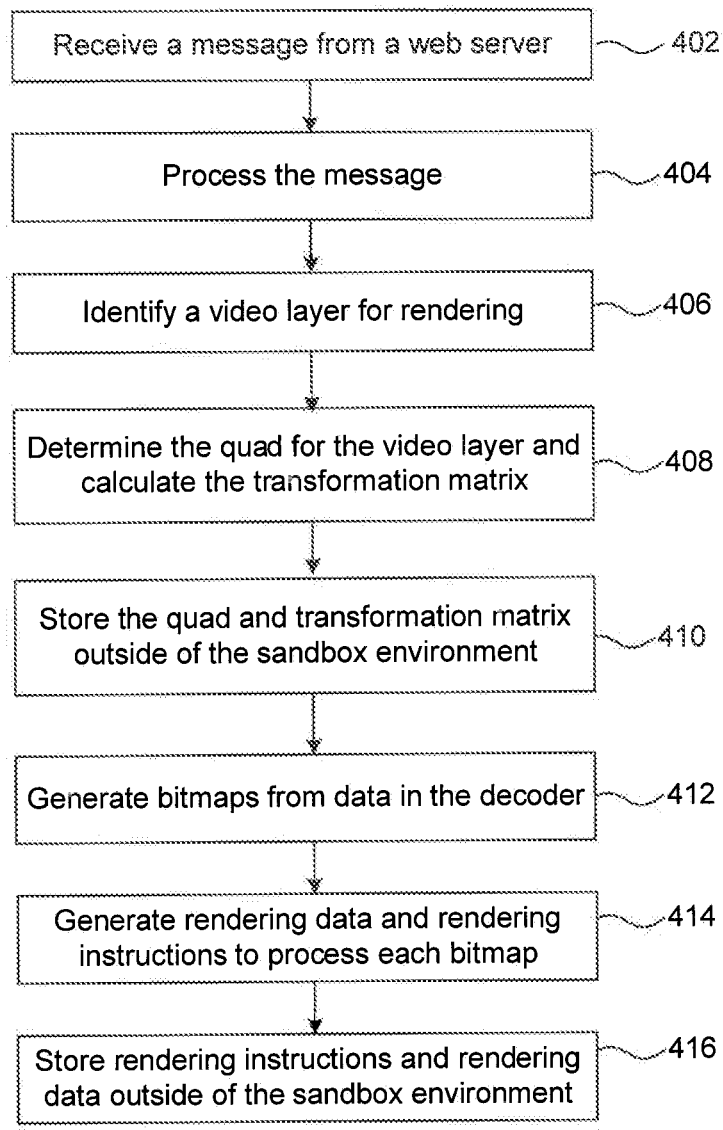
FIG. 4 is a flowchart of a method for generating rendering instructions and rendering data that includes video content, according to an embodiment.

FIG. 4 is a flowchart of a method 400 for generating rendering instructions and rendering data, according to an embodiment.

At stage 402, a message that includes video content is received. For example, browser 110 on client 106 receives a web message from web server 104.

At stage 404, the message is processed. For example, rendering module 108 generates a DOM tree from the web message, rendering objects and rendering layers. As described herein, rendering layers that include video content are video layers.

At stage 406, a video layer that requires rendering is identified. For example, layout engine 202 identifies the video layer that includes content that is not displayed on a display screen.

At stage 408, the coordinates of the quad and the transformation matrix are determined. For example, compositor 204 determines the quad that corresponds to the video layer identified in stage 406. Compositor 204 also determines the transformation matrix that transforms the quad into a correct position on display screen and retrieves a scaling factor from layout engine 202.

At stage 410, a quad and a transformation matrix are stored outside of the sandbox environment. For example, compositor 204 stores the set of coordinates that define the quad as rendering data 209 and the transformation matrix as rendering instructions 207 in shared system memory 112.

At stage 412, the bitmaps are generated. For example, compositor 204 generates a bitmap for each channel in video decoder 203. For a YUV color processing scheme, compositor 204 generates a bitmap for a Y channel, a U channel and a V channel.

At stage 414, rendering data that includes each bitmap is generated and texture update instructions are calculated. For example, compositor 204 generates rendering data 209 for a bitmap that corresponds to each of the Y channel, the U channel, and the V channel. Compositor 204 also generates rendering instructions 207 for updating each bitmap in a quad.

At stage 416, the bitmaps and the corresponding rendering instructions are stored outside of the sandbox environment. For example, compositor 204 stores the bitmaps that correspond to the Y, U and V channels as rendering data 209 in data region 208. Compositor 204 also stores rendering instructions 207 that update each bitmap in command buffer 206.

Figure 5:
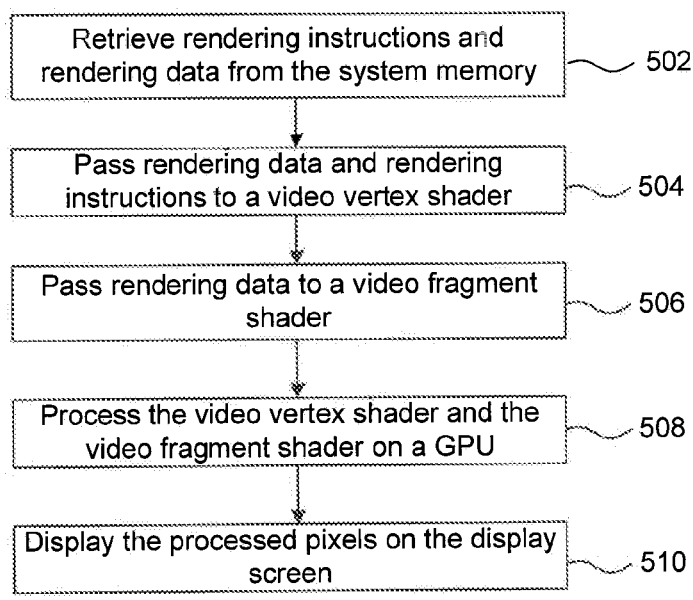
FIG. 5 is a flowchart of a method for using a video vertex shader and a video fragment shader to display video content using a GPU, according to an embodiment.

FIG. 5 is a flowchart of a method 500 for processing the rendering instructions and rendering data using a GPU, according to an embodiment.

At stage 502, the rendering instructions and rendering data are retrieved. For example, GPU processing module 114 retrieves rendering instructions 207 and rendering data 209 from shared system memory 112.

At stage 504, a video vertex shader receives rendering instructions and rendering data. For example, GPU processing module 114 passes rendering data 209 that includes a quad and rendering instructions 207 that include the transformation matrix to video vertex shader 214. Video vertex shader 214 determines the position and the orientation of the quad that contains a video displayed on the display screen.

At stage 506, a video fragment shader receives rendering data. As described herein, video fragment shader includes instructions for determining the RGB color of each pixel of a texture included in the quad.

At stage 508, a GPU processes the video vertex shader and the video fragment shader. For example, GPU 120 receives instructions to process a video layer using video vertex shader 214 and video fragment shader 216, as described herein. When GPU 120 processes instructions included in video vertex shader 214 and video fragment shader 216 it calculates the location and color of each pixel that is displayed on a display screen.

At stage 510, the pixels are displayed. For example, GPU draws the processed pixels on the display screen where the pixels are displayed using browser 110.

Figure 6:
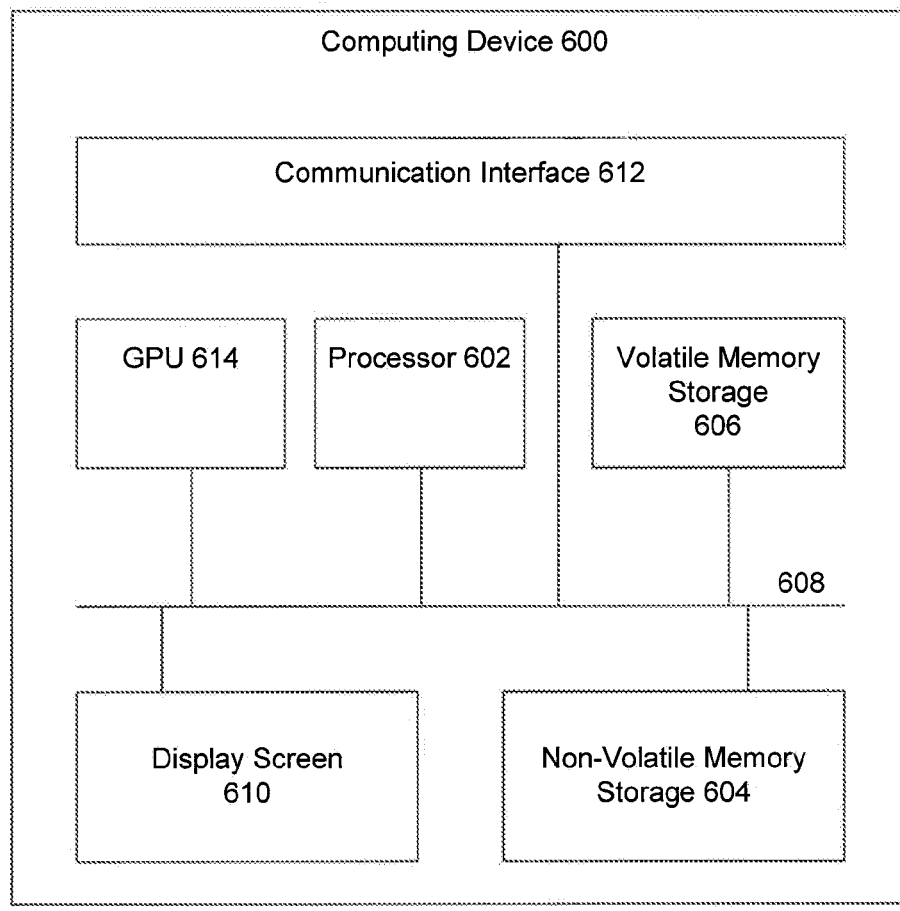
FIG. 6 is a block diagram of an exemplary computing environment, according to an embodiment.

FIG. 6 is an example computer system 600 in which embodiments of the present invention, or portions thereof, may be implemented as computer-readable code. For example, the components or modules of system 100 may be implemented in one or more computer systems 600 using hardware, software, firmware, tangible computer-readable media having instructions stored thereon, or a combination thereof, and may be implemented in one or more computer systems or other processing systems. Hardware, software, or any combination of such may embody any of the modules and components in FIGS. 1-5.

Web server 104 and client 106 can include one or more computing devices. According to an embodiment, web server 104 and client 106 can include one or more processors 602, such as processor 122 one or more non-volatile storage mediums 604, and one or more memory devices 606, a communication infrastructure 608, a display screen 610 and a communication interface 612. Processors 602 can include any conventional or special purpose processor, including but not limited to, digital signal processor (DSP), field programmable gate array (FPGA), and application specific integrated circuit (ASIC). Example processor 612 is processor 122 of FIG. 1.

GPU 614 is a specialized processor that executes instructions and programs, selected for complex graphics and mathematical operations, in parallel. Example GPU 614 is GPU 120 of FIG. 1.

Non-volatile storage 604 can include one or more of a hard disk drive, flash memory, and like devices that can store computer program instructions and data on computer-readable media. One or more of non-volatile storage device 604 can be a removable storage device. Memory devices 606 can include one or more volatile memory devices such as, but not limited to, random access memory. Communication infrastructure 608 can include one or more device interconnection buses such as Ethernet, Peripheral Component Interconnect (PCI), and the like.

Typically, computer instructions executing on web server 104 or client 106 are executed using one or more processors 602 and can be stored in non-volatile storage medium 604 or memory devices 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communication port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communication path. A communication path carries signals and may be implemented using wire or cable, fiber optics, a phone line, a cellular phone link, an RF link or other communications channels.

Embodiments may also be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teachings and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary section may set forth one or more, but not all exemplary embodiments as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method for an accelerated rendering of a video on a browser comprising:
    identifying a video layer that requires rendering;
    generating a plurality of bitmaps for updating a plurality of textures that make up a quad included in the video layer;
    generating a set of rendering instructions for updating the plurality of textures;
    storing the plurality of bitmaps and the set of rendering instructions in a memory region accessible to components existing within a sandbox environment and outside of the sandbox environment, and wherein the plurality of bitmaps are included in the plurality of textures;
    processing the plurality of textures using the set of rendering instructions, wherein the processing includes compositing the video layer on a webpage; and
    displaying the video included in the video layer on the browser.

2. The computer-implemented method of claim 1, wherein each bitmap in the plurality of bitmaps is associated with a color component.

3. The computer-implemented method of claim 2, wherein a bitmap is generated for a luminance component.

4. The computer-implemented method of claim 2, wherein a bitmap is generated for a chrominance component.

5. The computer-implemented method of claim 2, the plurality of textures are in the YUV color scheme.

6. The computer-implemented method of claim 1, wherein the processing further comprising determining an orientation and a position of a quad on the webpage.

7. The computer-implemented method of claim 1, further comprising determining an RGB color of each pixel in the plurality of pixels.

8. A system for an accelerated rendering of a video on a browser comprising:
    a layout engine configured to identify a video layer that requires rendering;
    a video decoder configured to generate a plurality of bitmaps for updating a plurality of textures that make up a quad included in the video layer;
    a compositor configured to generate a set of rendering instructions, the set of rendering instructions including instructions for updating the plurality of textures;
    a memory storage configured to store the plurality of bitmaps in the plurality of textures and the set of rendering instructions, wherein the memory storage is a memory region accessible to components existing within a sandbox environment and outside of the sandbox environment;
    a graphics processing unit (GPU) processing module configured to retrieve the plurality of textures and the set of rendering instructions and associate the plurality of textures and the set of rendering instructions with at least one video shader; and
    a GPU configured to execute the at least one video shader to display the video included in the video layer on a webpage displayed on a display screen.

9. The system of claim 8, wherein the GPU processing module further comprises:
    a video vertex shader configured to receive the plurality of textures that include the plurality of bitmaps and the rendering instructions and determine a position and orientation of the quad; and
    a video fragment shader configured to generate an RGB color for each pixel included in the quad.

10. The system of claim 8, wherein the GPU processing module is located outside of the sandbox environment.

11. The system of claim 8, wherein each bitmap in the plurality of bitmaps is associated with a color component.

12. The system of claim 11, wherein a bitmap is generated for a luminance component.

13. The system of claim 11, wherein a bitmap is generated for a chrominance component.

14. The system of claim 11, wherein the plurality of textures are in the YUV color scheme.

15. An article of manufacture including a computer-readable medium having instructions stored thereon that, when executed by a computing device cause the computing device to perform operations for an accelerated rendering of a video on a browser, the operations comprising:
    identifying a video layer that requires rendering;
    generating a plurality of bitmaps for updating a plurality of textures that make up a quad included in the video layer;
    generating a set of rendering instructions for updating the plurality of textures;
    storing the plurality of bitmaps and the set of rendering instructions in a memory region accessible to components existing within a sandbox environment and outside of the sandbox environment, and wherein the plurality of bitmaps are included in the plurality of textures;
    processing the plurality of textures using the set of rendering instructions, wherein the processing includes compositing the video layer on a webpage; and
    displaying the video included in the video layer on the browser.

16. The computer-readable medium of claim 15, wherein each bitmap in the plurality of bitmaps is associated with a color component.

17. The computer-readable medium of claim 16, wherein a bitmap is generated for a luminance component.

18. The computer-readable medium of claim 16, wherein a bitmap is generated for a chrominance component.

19. The computer-readable medium of claim 16, wherein the plurality of textures are in the YUV color scheme.

20. The computer-readable medium of claim 15, wherein the processing further comprising determining an orientation and a position of a quad on the webpage.

* * * * *

UNITED STATES PATENT AND TRADEMARK OFFICE
CERTIFICATE OF CORRECTION

PATENT NO. : 8,913,068 B1  
APPLICATION NO. : 13/367119  
DATED : December 16, 2014  
INVENTOR(S) : Kokkevis et al.

Page 1 of 1

It is certified that error appears in the above-identified patent and that said Letters Patent is hereby corrected as shown below:

In the Claims

Column 9, line 53, Claim 6, please replace "comprising" with --comprises--.

Column 10, line 65, Claim 20, please replace "comprising" with --comprises--.

Signed and Sealed this  
Twenty-first Day of April, 2015

Michelle K. Lee  
*Director of the United States Patent and Trademark Office*